Feb. 27, 1968 R. S. WOOLDRIDGE ET AL 3,370,802

TAPE LOOP CONTROL CIRCUIT

Filed June 4, 1965 2 Sheets-Sheet 1

INVENTORS
ROBERT S. WOOLDRIDGE
JOSEPH E. KIENLE

BY Edward M. Farrell

ATTORNEY

TAPE LOOP CONTROL CIRCUIT

Filed June 4, 1965 2 Sheets-Sheet 2

| SUPPLY REEL LOGIC | | | |
|---|---|---|---|
| | RUN FORWARD | STOP | RUN BACKWARD |
| ABOVE UPPER SWITCH | DOWN TDS=OFF | DOWN TDS=OFF | OFF |
| BETWEEN SWITCHES | DOWN TDS= REDUCED UP | OFF TDS= UP TUS=DOWN | UP TUS = OFF |
| BELOW LOWER SWITCH | OFF TDS= REDUCED UP | UP TUS=OFF | UP TUS=OFF |

TUS=120% SPEED UP • LOWER + 50% SPEED UP • NOT LOWER

TDS=120% SPEED DOWN • UPPER + 50% SPEED DOWN • NOT UPPER

Fig. 3

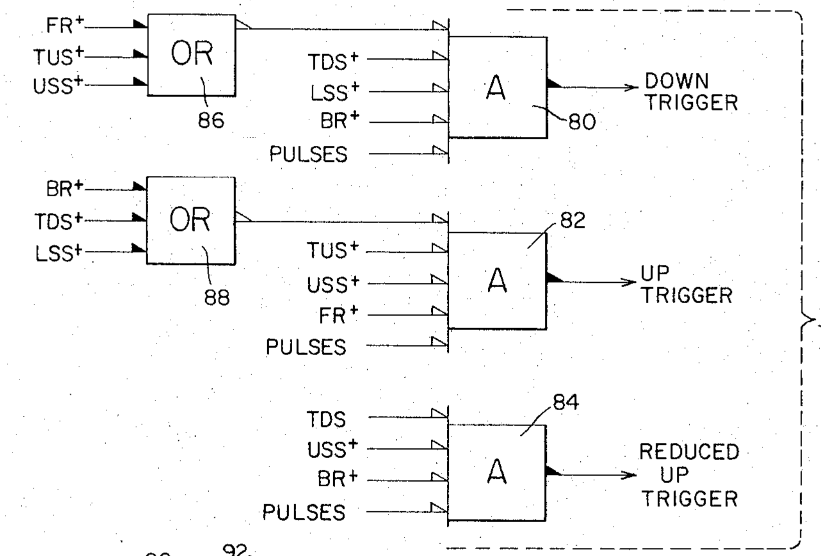

Fig. 4

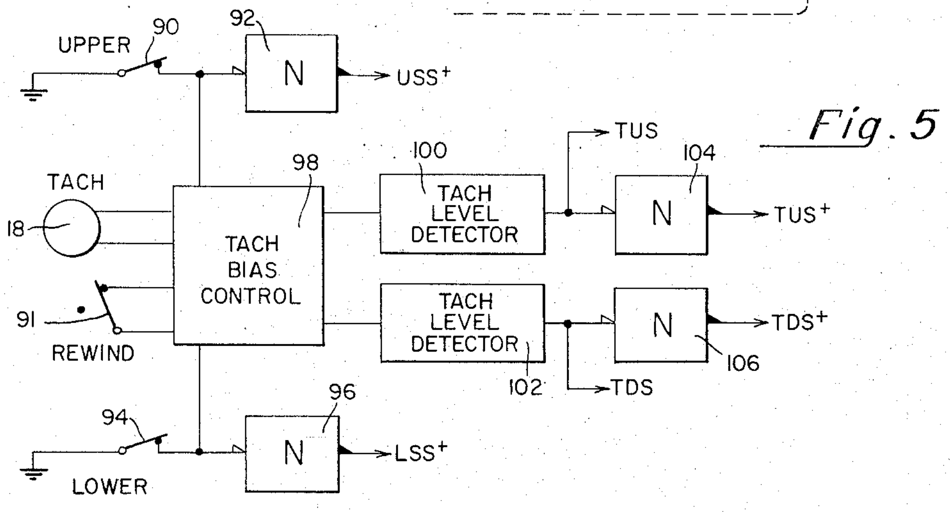

Fig. 5

3,370,802

TAPE LOOP CONTROL CIRCUIT

Robert S. Wooldridge, Norristown, and Joseph E. Kienle, Dresher, Pa., assignors to Sperry Rand Corporation, New York, N.Y., a corporation of Delaware Filed June 4, 1965, Ser. No. 461,254
8 Claims. (Cl. 242—55.12)

ABSTRACT OF THE DISCLOSURE

A tape loop position control having a tape reel and reel motor for dispensing or taking up tape, a tape loop box which contains upper and lower loop position switches and a reel motor control circuit are included. A tape speed sensing device for sensing the reeling speed is connected to the reel motor control circuit together with the output of the loop position sensing switches so as to turn the reel motor on and off to control the length of the loop.

This invention relates to tape loop boxes, and more particularly to tape loop boxes for controlling the length of tape loops in the loop box.

In tape transport systems, it is customary to drive magnetic tape in either of two directions across a magnetic head to cause information to be read on to or from the tape. The tape is supplied from a supply reel to the magnetic head and taken up to a take-up reel after it has passed the magnetic head. A pair of drive motors generally drive the reels in a predetermined direction and at a speed determined by the amount of tape on the reels and various other operating conditions within a computer.

In a tape transport system, a pair of loop boxes are generally provided. One of these loop boxes adapted to receive a loop of tape is generally disposed between the supply reel and the magnetic head. The second loop box also adapted to receive a loop of tape is generally disposed between the magnetic head and the take-up reel.

The reason for the loop boxes is to provide slack loops of tape to compensate for speed variations in the take-up or supply reel. Theoretically it may appear desirable to have extremely long lengths of tape. However, if the loops of tape are made too great, problems relating to the acceleration of the tape from a stationary position develop. In order to obtain maximum acceleration of tape during operation, it is generally desirable to maintain a relatively short loop of tape between the supply reel and the magnetic head. This minimizes the amount of tape which must be moved. It is also generally desirable to have the loop of tape in the loop box between the take-up reel and the magnetic head to be relatively long to provide a maximum length of slack in the tape. In the remarks made thus far, it is assumed that the tape is to be moved in a forward direction.

If the tape is to be moved backward, the reverse operating condition to that just described is desirable. In this case, when the tape is moving backward, it is desirable that the loop of tape in the loop box between the take-up reel and the magnetic head be relatively short and the loop of tape in the loop box between the head and the supply reel be relatively long.

One of the problems found in many tape transport systems relates to changing the lengths of tape loops in a minimum amount of time whenever the tape changes direction. Another problem resides in maintaining the desired lengths of tape loop efficiently and economically.

It is an object of this invention to provide improved tape loop control means in a tape transport system.

It is a further object of this invention to provide an improved tape loop control means for quickly switching the tape loop lengths within a pair of loop boxes in accordance with the direction of tape movement.

It is still a further object of this invention to provide an improved tape loop control means for maintaining the loops at relatively constant lengths within a pair of loop boxes during operation.

In accordance with the present invention, loop boxes for controlling the length of loops of tape therein are provided as are a pair of motor driven reels which hold the tape. An upper switch is disposed towards the top of each loop box and a lower switch is disposed towards the bottom of each loop box. The switches are open or closed dependent upon whether the tape is above or below the switches. Tachometers detect the speed of the tape during operation and generate electrical signals representative of the speed of the tape. A pair of counter-rotating capstans drive the tape at a predetermined set speed in one of two directions. A pair of circuits drive the pair of reel motors in one of two directions at a rate of speed dependent upon the signals from the tachometers and the operating states of the switches. The reels are speeded up to increase the length of the loop of tape in the loop box or slowed down to decrease the length of loop in the loop box dependent upon the direction of the tape movement and the length of the tape loops within the loop boxes.

Other objects and advantages of the present invention will be apparent and suggest themselves to those skilled in the art, from a reading of the following specification and claims, in conjunction with the accompanying drawings, in which:

FIGURE 3 is a table illustrating the supply reel logic, in accordance with with the present invention;

FIGURE 4 is a block diagram illustrating means for generating control signals for the reel drive motor, and FIGURE 5 is a block diagram illustrating means for generating signals to be applied to the means illustrated in FIGURE 4.

Figure 1:
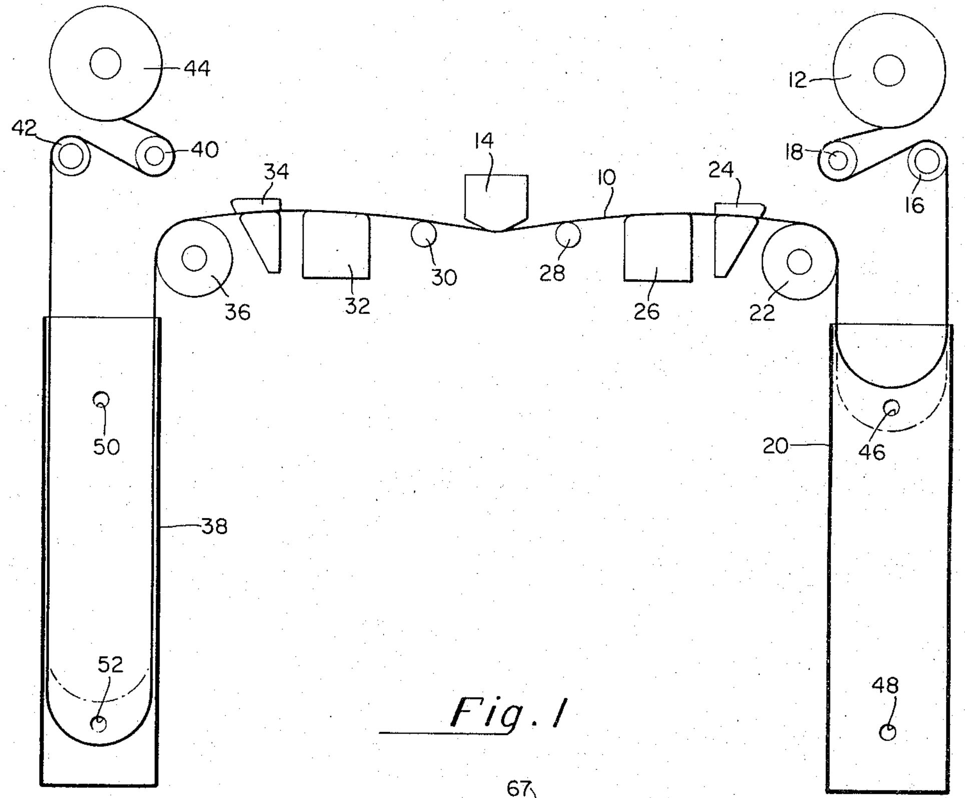
FIGURE 1 is a front view of a portion of a tape transport system illustrating the present invention.

Referring particularly to FIGURE 1, a portion of a tape transport system is illustrated. In the condition illustrated, the tape is assumed to be moving in the forward direction, i.e., toward the left. A magnetic tape 10 is supplied from a take-up reel 12 to a magnetic head 14. The tape is first supplied from a roller 16 over a tachometer 18. The tachometer is used to measure the speed of the tape 10 in a manner to be described. The tape 10 is then fed into a loop box 20 where a relatively short loop of tape is formed and maintained in a manner to be described.

The tape 10 is moved across a capstan 22, a guide element 24, a brake element 26, a roller 28 to the magnetic head 14. During this movement a vacuum or low pressure is applied to a capstan 36 to physically engage and move the tape. High pressure may be applied to the capstan 22 and the pair of brake elements 26 and 32 to cause the tape to be disengaged therefrom during the forward movement of the tape.

After the tape 10 has passed over the magnetic head, it passes over a second roller 30, the brake element 32, a guide element 34, the driving capstan 36 and into a second loop box 38. A relatively long loop of tape is formed in the loop box 38 after the tape leaves the loop box 38, it passes over a second tachometer 40, a roller 42 and finally to the take-up reel 44.

Upper and lower apertures 46 and 48, respectively, are provided in the loop box 20. Likewise, upper and lower apertures 50 and 52 are provided in the loop box 38. These apertures are used to detect the level of pressure to actuate vacuum switches, as will be described. Such vacuum switches are well-known to those skilled in the tape transport field. In general, it may be stated that the various vacuum switches associated with the apertures will be open or closed dependent upon whether the loop of tape is above or below the apertures.

Means for producing a low pressure or vacuum within the loop boxes between the bottom of the tape and the interior walls of the loop boxes are provided by means not illustrated. Generally, this vacuum or low pressure is produced by means of a D.C. series motor driving a pump. Such vacuum producing means are well known to those skilled in the art.

Figure 2:
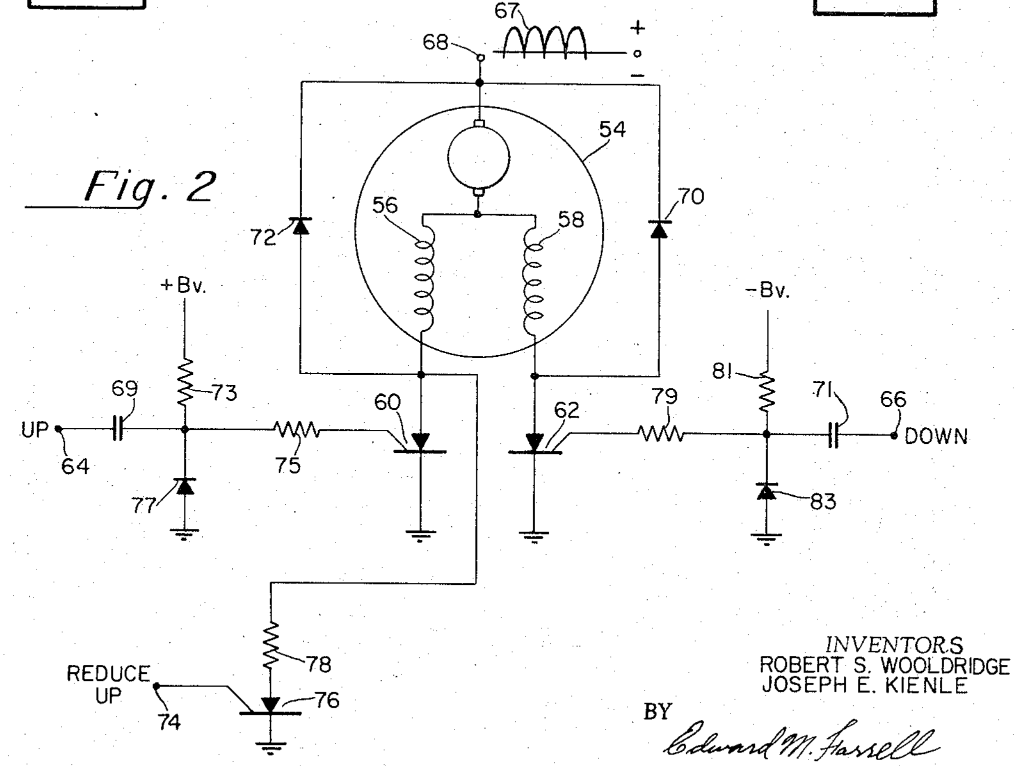
FIGURE 2 is a schematic diagram illustrating a circuit for controlling the speed of a reel drive motor, in accordance with the present invention.

Referring particularly to FIGURE 2, the circuitry for driving a drive motor is illustrated. This drive motor may be associated with either one of the reels 12 or 44. Because the type of motor and the associated circuitry is substantially the same, only one typical circuit will be described. A split series direct current motor 54 includes a pair of series windings 56 and 58. It is understood that the motor 54 may be appropriately mechanically connected to the reels 12 and 44 of FIGURE 1. The direction of rotation of the motor 54 is dependent upon the winding through which current is made to flow, i.e., either one of the windings 56 or 58. Such series D.C. motors, which are capable of rotation in either of two directions, are well known to those skilled in the art. A pair of silicon controlled rectifiers 60 and 62 are provided to control the current through the windings 56 and 58, respectively, thereby controlling the direction of rotation of the motor 54.

The silicon controlled rectifiers 60 and 62 are appropriately biased so that they are normally cut-off in the absence of any applied gating signals to either of the input terminals 64 and 66. The input terminals 64 and 66 are conected to receive signals from other control circuits in the system as will be described in connection with FIGURES 3, 4 and 5.

If a gating signal is applied from the terminal 66 to the gating electrode of the silicon controlled rectifier 62. the silicon controlled rectifier 62 will become conducting. A signal applied to the input terminal 66 indicates that it is desired to move the tape down lower into an associated loop box. A source of unfiltered full wave rectified voltage, illustrated by a waveform 67, is applied to an input terminal 68 to produce the driving current for the motor 54.

When the silicon controlled rectifier 62 becomes conducting, current flows from the terminal 68, through the winding 58 of the motor, through the anode and cathode of the silicon controlled rectifier 62, to a point of reference potential, designated as ground.

A silicon controlled rectifier has a characteristic that is somewhat similar to a diode except that it includes a gating electrode in addition to the conventional anode and cathode. When a silicon controlled rectifier is made conducting as a result of a trigger signal applied to its gating electrode, it will remain conducting even after the termination of the input trigger signal. Means must be taken to turn off the rectifier. The means used in the present invention involves the use of a full wave positive unfiltered rectified signal. The unfiltered signal goes negative for short periods of time for each half cycle. These negative signals act to turn off the rectifiers. The use of such signals to turn off silicon controlled rectifiers is well known to those skilled in this field.

It is is desired to move the motor 54 in the opposite direction, a signal is applied to the input terminal 64 to cause the silicon controlled rectifier 60 to become conducting. When this occurs, current flows from the terminal 68 through the winding 56, through the anode and cathode of the rectifier 60 to ground. Diodes 70 and 72 are connected across the windings of the motor to receive the high current resulting from the inductive reactance of the motor when the motor is suddenly turned off. These diodes are only incidentially related to the present invention. Capacitors 69 and 71 are coupling capacitors. Resistors 73 and 75, together with the diode 77, provide the proper operating bias potentials for the rectifier 60. Resistors 79 and 81, with the diode 83, provide the proper bias potentials for the rectifier 62.

As has been mentioned, the area between the bottom of the tape loop and the loop box is generally connected to a source of relatively low pressure. It is this low pressure which produces a pressure differential between the atmospheric pressure above the tape and the low pressure within the loop box. The differential pressure causes a tension on the tape to pull the tape into the form of loops, as illustrated in FIGURE 1.

The purpose of the silicon controlled rectifier 76 is to produce a reduced up signal to the motor 54. When the tape is being moved up the loop box, as when the tape is moving from a bottom aperture toward a top aperture, the tension on the tape within the loop box provides a counter-acting force tending to keep the tape in the down position. This tension or counter-acting force prevents the tape from being moved too rapidly from the bottom to the top of the loop box preventing the tape from actually leaving the loop box. This tape tension does not provide a counter-acting force when the tape is being moved down into the loop box, however.

When the tape is to be moved in a downward direction, for example, from a position adjacent the upper aperture to a position adjacent the lower aperture, the tension on the tape tends to speed up the already rapidly moving tape. In order to prevent the tape from hitting the bottom of the loop box and possibly accumulating or folding in a manner to destroy or damage the tape, some counter-acting means to control the rapid downward movement of the tape must be provided.

This counter-acting force is provided for by applying a signal to an input terminal 74 to cause a normally nonconducting silicon controlled rectifier 76 to become conducting. The silicon controlled rectifier is connected through a limiting resistor 78, through the winding 56, to the source of driving voltage at the input terminals 68.

When the tape is being moved down at a rapid rate due to the conduction of the silicon controlled rectifier 62, the effect of the conduction of the silicon controlled rectifier 76 is to try to cause the tape to move up. However, because this effect is much smaller than the down effect because of the lower current, the tape will continue to move down but at a reduced rated because of the signal applied to the input terminal 74. Thus the tape tension provides a counter-acting force to slow down the tape when it is being moved up and the conduction of the rectifier 76 provides the counter-acting force when the tape is being moved down.

In order to produce the various control signals at the input terminals 64, 66 and 74, it is necessary that various conditions be present in the computer system. These conditions involve the presence or absence of such signals as forward run, backward run, stop, and signals representing the speed at which the tape is being moved.

The following table of abbreviations, used in conjunction with FIGURES 3, 4 and 5 will generally represent the various types of signals which must be present in order to attain the desired operation described above:

*Table of abbreviations*

FR—Forward Run (indicating tape is moved by forward capstan).

BR—Backward Run (indicating tape is moved by backward capstan).

TUS—Tachometer Up Supply (indicating supply reel moving tape up at a greater rate than the set level).

TDS—Tachometer Down Supply (indicating supply reel moving tape down at a greater rate than the set level).

USS—Upper Switch Supply (indicating upper switch is closed).

LSS—Lower Switch Supply (indicating lower switch is closed).

A plus sign after the above signals indicates positive signals. The absence of a plus sign indicates negative signals.

The capstans driving the tape, which may be counter-rotating capstans 22 and 36 (FIGURE 1) are driven at a relatively constant speed to move the tape 10. These capstans may be of the vacuum type wherein a vacuum is applied to one of the capstans to physically engage and move the tape while high pressure is applied to the other capstan to cause disengagement of the tape. The particular capstan receiving the vacuum or high pressure will be dependent upon the direction in which the tape is to be moved. However, both capstans are continuously moving at a relatively constant speed. The variations in the lengths of the tape loops are achieved not by the capstans varying speed, but rather by varying the speeds of the motors driving the reels.

In describing the operation of the tape loop boxes 20 and 38, only the operation of the loop box 20 will be described since the operation relating to the loop box 38 is substantially the same. When the tape is moving forward, the tape will be near the top of the loop box 20 and the bottom of the loop box 38. When the tape is moving backwards, the reverse is true. However, the basic logic to control both loops is the same. This is for purposes of explanation either reel may be considered as the supply or take-up reel dependent upon the direction of tape movement. Thus, while FIGURE 3 refers to the supply reel logic, it is equally applicable to either reel.

Referring to FIGURE 3, a chart illustrates the basic operation for a particular reel motor with forward run operation in the first column, stop in the second column and the run backward operation in the third column. The rows in the chart illustrate the positions of the tape loop, i.e., above the upper switch, between switches and below the lower switch. During the forward run operation, the reel 12 must supply tape down into the loop box.

TDS is the tachometer set level when the tape is to be moved down into the loop box. TUS is the tachometer set level when the tape loop is to be moved up. The set levels are related to the speed of the tape as related to the nominal speed or speed of the capstan. There may be two different set levels to produce these signals, as will be described.

During the run forward operation, the reel motor driving the reel 12 runs at full torque until the tachometer reaches its set level to produce a TDS signal. If the tape is above the upper switch, the set level is 120% of the speed of the capstan 22. At this point, the TDS signal will turn off the motor driving the reel 12. The reel motor will then coast when it is above the upper switch. However, since the tape is being moved faster than the capstan, the tape loop moves down into the box.

When the tape moves down and is between the switches, associated with apertures 46 and 48, i.e., below the upper switch, the reel motor again will drive at full down torque until the tachometer reaches its set level to produce a TDS. When the tape loop is below the upper switch, the set level of TDS is 50% the speed of the capstan 22. When the TDS signal is present, a reduced up signal will be generated. Of course, the tape still tends to move down due to tape tension and some means must be employed to slow down the reel motor. The reduced up torque is set to counter-act the loop box tape tension so that the loop will not coast to the bottom of the loop box. However, since the capstan now drives the tape faster than the reel motor, the tape loop moves up in the loop box and the cycle will be repeated. The tape loop will then bounce around the upper switch in the forward run position.

If for some reason the tape loop drops below the lower switch, the motor driving the reel 12 is turned off. If a TDS signal is also set, a reduced up torque is produced to slown down the reel motor. The operation described is generally illustrated in the first column of the chart in FIGURE 3.

It is noted that a TDS signal will be produced when the tape is above the upper switch and is being moved at a rate of speed 120% of the speed of the capstan. The same TDS signal will be produced if the tape loop is below the upper switch and moved at a rate of speed which is 50% of the speed of the capstan.

Let us now consider the operation related to run backward. This condition of operation is illustrated in the third column of FIGURE 3. In a run backward operation, it is necessary that the tape loop be disposed close to the bottom of the loop box and bounce about the lower switch associated with the aperture 48.

If the tape is above the upper switch, the reel drive motor driving the reel 12 will be in an off condition. This means that the capstan 22 will feed tape into the loop box 20.

When the tape moves between the upper and lower switches, the reel motor runs at full up torque until the tachometer recahes its set level and then the reel motor will coast. The tachometer set level is designated by a TUS signal and will be developed for two different tape speeds dependent upon the position of the tape loop. While the reel motor is coasting it is slowed down by the loop box tape tension. The tachometer is set at about 50% of the speed of the capstan for the loop above the lower switch to generate a TUS signal. This causes the motor to start coasting. Thus when the tape loop is above the lower switch, the capstan drives the tape faster than the reel motor and the loop moves down into the box. The motor is driven at full up torque until TUS sets, at which point the motor is shut off.

When the tape moves below the lower switch, the tachometer is set at about 120% of the speed of the capstan to produce a TUS signal which causes the drive motor to coast. At this point, the capstan drives the tape slower than the reel motor and the tape loop starts to move up the loop box and the cycle will be repeated. The loop will then bounce about the lower switch in the backward run condition. The latter described operation is illustrated in column 3 of FIG. 3.

The stop operation is illustrated in FIGURE 3 in the second column. If the tape loop is above the upper switch, the reel motor runs full down torque until the tachometer reaches 120% of the capstan speed. Under these conditions, a TDS signal is generated to turn off the reel motor permitting it to coast.

When the tape loop is below the lower switch, the reel motor runs full up torque until the tachometer reaches 120% of the capstan speed to generate a TUS signal which turns off the motor permitting it to coast.

When the tape loop is between the upper and lower switches, the reel motor receives full down torque for an up tachometer speed greater than 50% of the capstan speed and receives full up torque for a down tachometer speed greater than 50% of the capstan speed. Otherwise, the reel motor will coast. The tape loop will then bounce between the loop switches for a stop condition.

During normal operation, if the capstan has stopped for a short time, the loops of tape will be between the switches and the reel motor brakes may be applied.

The chart of FIGURE 3 illustrates the various conditions which must be present to generate the trigger signals necessary to cause a silicon controlled rectifier to become conducting to drive the selected reel motor. When these signals are generated, they may be applied to the various input terminals, as illustrated in FIGURE 2, to control the speed and direction at which the motors driving the reels are moved.

Referring particularly to FIGURE 4, some logical circuitry is illustrated in the form of a block diagram to illustrate how appropriate signals, such as down trigger (applied to terminal 66 of FIGURE 2), up trigger (applied to input terminal 64 of FIGURE 2) and reduced up trigger (applied to input terminal 74 of FIGURE 2) are generated. Appropriate signals will be generated at the output of AND gate circuits 80, 82 and 84 when various input signals are applied thereto. Positive output signals are generated by the gate circuits to drive the reel motors.

In general, the blocks illustrated invert the signals. The actual circuitry for the AND and OR gates may be the same and include a diode coupled input. Any positive input signal produces a negative output signal at the OR gate. If all input signals to the AND gate are negative, a positive output signal will be developed.

In order for a down trigger signal to be developed, it is necessary that signals representing the tachometer down supply (TDS), lower switch supply (LSS), backward run (BR), and pulses be applied to the AND gate circuit 80 be all at a negative level. These pulse signals are negative and may be developed by an oscillator or other suitable means within the system. A positive level of any one of these signals will inhibit an output down trigger signal from the AND gate 80. In addition to all of the signals mentioned being negative, an output signal must be received from an OR gate circuit 86. The OR gate circuit 86 will produce an output signal when any one of the following signals are applied to its input: forward run (FR), tachometer up supply (TUS), upper switch supply (USS). Thus a positive forward run signal applied to the OR gate 86 results in a negative signal being applied to the AND gate 80 to produce a down trigger signal unless the AND gate is otherwise inhibited.

When it is desired to produce an up trigger signal, an output signal must be developed by the AND gate circuit 82. All of the following signals must be negative in order to develop an output signal from the AND gate 82: an output signal from OR gate 88, TUS, USS, FR and timing pulses. An output signal from the OR gate 88 will be developed when any of the following signals is positive and is applied to its input: BR, TDS or LSS. Thus a BR (backward run) signal will produce an up trigger signal at the AND gate 82 unless the AND gate 82 is otherwise inhibited.

When it is desired to produce a reduced up trigger signal, an output signal must be developed at the AND gate 84. This output signal will be developed when all of the following input signals are negative and applied to the AND gate 84: TDS, USS, BR and timing pulses.

Going back further into the circuitry needed to generate the signals for the circuitry of FIGURE 4, FIGURE 5 illustrates in block diagram some of the logical circuits which may be employed to generate these signals.

It is understood that the circuitry discussed in connection with FIGURES 3, 4 and 5 is related to one loop box. Substantially the same type of circuitry will be employed in connection with the other loop box. All the discussion, therefore, is related to the loop box 20, although it is also applicable to the loop box 38.

When the vacuum switch 90 associated with the upper aperture 46 is closed, a circuit 92 develops a signal representing upper switch supply (USS). The USS signal may be applied to the AND gate circuits 82 and 84 of FIGURE 4 to develop positive inhibit signals.

When the lower switch 94, associated with the lower aperture 48, is closed, a circuit 96 is actuated to cause a lower switch supply signal (LSS) to be developed. This signal is also applied to the AND gate circuit 80 of FIGURE 4 to provide a positive inhibit signal.

The tachometer 18 has a characteristic that it will generate a voltage representing the speed at which the tape is being supplied to the loop box 20 from the reel 12. The amplitude of this voltage represents speed and the polarity represents direction. The output voltage from the tachometer 18 is applied to a tachometer bias control circuit 98. A pair of tachometer level detector circuits 100 and 102 are employed to produce TUS and TDS signals, respectively. These detector circuits may be Schmitt Trigger Circuits adapted to be switched by input signals. The bias control circuit 98 may be part of the input circuits of the detectors and merely controls the input level at which the detector circuits will switch. For example, the detector circuits may be made to switch at high or low levels, dependent upon the positions of the switches 90 and 94. The switches, for example, may be used to short out resistors in a circuit to change bias potentials.

The tachometer level detector circuit 100 is used to generate a TUS signal. For example, this signal would be generated when the speed of the tachometer 18 exceeds 50% or exceeds 120% the speed of the capstan 22 provided other conditions previously described are also present. The TUS signal, which may be neagtive, may be applied to an inverter circuit 104 to generate a signal representing the opposite of TUS, i.e., a signal of positive polarity. The positive TUS signal may be applied to the AND gate 82 to provide an inhibit signal. It is also applied to the OR gate 86. The negative TUS signal may be used elsewhere in the computer.

The tachometer level detector circuit 102 will detect the voltage from the tachometer which represents that the tape is being moved by the capstan 22 at a rate of speed which is 120% or 50% the speed of the capstan 22 to produce a TDS signal. The output signal from the level detector circuit 102 generates a TDS signal when certain other conditions as previously described are present. The TDS signal, which may be of negative polarity, may be applied to an inverter 106 to produce an output signal the opposite to that of TDS, i.e., a signal of positive polarity.

The positvie TDS signal is applied to inhibit an output from the AND gate 80 and is also applied to the OR gate 88. The negative TDS signal is applied to the AND gate 84 to produce a reduced up trigger.

A switch 91 permits a different rewind speed operation by changing the bias level of the circuit 98. The switch 91 may also actuate circuitry for changing the speed of the capstan. Since this circuitry is only incidentally related to the present invention, complete details relating thereto are not given.

There has been thus described a relatively simple system in which the lengths of loops may be controlled to stay about the bottom or top of a tape loop box, dependent upon the direction of movement of the tape. In addition, there has been provided a relatively quick means for changing the operating conditions of the tape from a lower loop to a higher loop, and vice versa.

The embodiments of the invention in which an exclusive property or privilege is claimed are defined as follows:

1. In combination with a tape transport system wherein tape is moved at a relatively constant speed across a magnetic head during operation, a loop box for controlling the length of loop therein to provide a long loop or a short loop, a reel for dispensing and receiving said tape, a motor for driving said reel in either of two directions, means for detecting the length of said tape within said loop box to produce signals representing the position of said loop, speed detecting means for generating signals representing the speed of said tape at said reel, pulse signal generating means coupled to receive the tape speed signals and the loop position signals and to generate control pulses in response to a predetermined relationship between the tape speed signals and the loop position signals, and motor control circuitry coupled to receive said control pulses and to control the speed of said motor in response to said control pulses.

2. In combination with a tape transport system wherein tape is moved at a relatively constant speed across a magnetic head during operation, a loop box for controlling the length of loop therein to provide a long loop or a short loop, a reel for dispensing and receiving said tape, a motor for driving said reel in either of two directions, means including upper and lower apertures within said loop box for detecting the length of said tape within said loop box to produce signals representing the position of said loop, speed detecting means for generating signals representing the speed of said tape at said reel, pulse signal generating means coupled to receive the tape speed signals and the loop position signals and to generate control pulses in response to a predetermined relationship between the tape speed signals and the loop position signals, and motor control circuitry coupled to receive said control pulses and to control the speed of said motor in response to said control pulses, and means for limiting the speed at which said loop of tape changes from a long loop to a short loop.

3. In combination with a tape transport system wherein tape is moved at a relatively constant speed across a magnetic head during operation, a loop box for controlling the length of loop therein to provide a long loop or a short loop, a reel for dispensing and receiving said tape, a motor for driving said reel in either of two directions, means including upper and lower apertures associated with switches within said loop box for detecting the length of said tape within said loop box to produce signals representing the length of said loop, a tachometer for generating signals representing the speed of said tape at said reel, and a pair of silicon controlled rectifiers for receiving the signals from said tachometer to control the speed of said motor, and means for applying an additional signal to one of said silicon controlled rectifiers for limiting the speed at which said loop of tape changes from a long loop to a short loop.

4. In combination with a system having a loop box for controlling the length of a loop of tape therein, a reel for dispensing and receiving said tape, a motor for driving said reel, an upper switch disposed towards the top of said loop box responsive to the length of said tape, a lower switch disposed towards the bottom of said loop box responsive to the length of said tape, a tachometer for generating a signal representing the speed of said tape from said reel, a relatively constant speed rotatable capstan to drive said tape, a pair of silicon controlled rectifiers normally non-conducting connected to drive said motor, means for driving a selected one of said silicon controlled rectifiers to a conducting state to drive said motor in one of two directions dependent upon which one of said silicon controlled rectifiers is made conductive, said last named means including circuits for generating signals representing the speed of said tape, the operating states of said upper and lower switches and, signals representing the direction in which said tape is to be moved, whereby the speed of said reel is varied to increase the length of said loop of tape in said box or to decrease the length of loop in said loop box dependent upon the direction of said tape movement and the length of said tape.

5. In combination with a loop box for controlling the length of a loop of tape therein, a reel for dispensing and receiving said tape, a motor for driving said reel, an upper switch disposed towards the top of said loop box, said upper switch being open or closed dependent upon whether said tape is disposed above or below thereof, a lower switch disposed towards the bottom of said loop box, said lower switch being open or closed dependent upon whether said tape is disposed above or below thereof, a tachometer for detecting the speed of said tape from said reel during operation and for generating a signal representing said speed, a capstan disposed to drive said tape at a predetermined set speed, a pair of silicon controlled rectifiers normally non-conducting connected to drive said motor, means for driving a selected one of said silicon controlled rectifiers to a conducting state to drive said motor in one of two directions dependent upon which one of said silicon controlled rectifiers is made conductive, said last named means including circuits for generating signals representing the speed of said tape and the operating states of said upper and lower switches, whereby the speed of said reel is varied to increase the length of said loop of tape in said box or to decrease the length of loop in said loop box dependent upon the direction of said tape movement and the length of said tape.

6. In combination with a loop box for controlling the length of a loop of tape therein, a reel for dispensing and receiving said tape, a motor for driving said reel, an upper switch disposed towards the top of said loop box, said upper switch being open or closed dependent upon whether said tape is disposed above or below thereof, a lower switch disposed towards the bottom of said loop box, said lower switch being open or closed dependent upon whether said tape is disposed above or below thereof, a tachometer for detecting the speed of said tape from said reel during operation and for generating a signal representing said speed, a capstan disposed to drive said tape at a predetermined set speed, a pair of silicon controlled rectifiers normally non-conducting connected to drive said motor, the first of said silicon controlled rectifiers being connected to drive said tape in a forward direction and the second silicon controlled rectifier being connected to drive said tape in a backward direction, means for driving a selected one of said silicon controlled rectifiers to a conducting state to drive said motor in one of two directions dependent upon which one of said silicon controlled rectifiers is made conductive, said last named means including circuits for generating signals representing the speed of said tape and the operating states of said upper and lower switches, whereby the speed of said reel is varied to increase the length of said loop of tape in said box or to decrease the length of loop in said loop box dependent upon the direction of said tape movement and the length of said tape, and means for applying an additional signal to one of said silicon controlled rectifiers when the length of said tape loop changes from a long loop to a short loop to limit the speed at which the length of tape loop is changed.

7. The invention as set forth in claim 6 wherein said sytsem is duplicated, to provide two substantially similar loop control systems, with one system being associated with means for supplying tape to a magnetic head and the other system being associated with means for receiving tape after it has passed over a magnetic head.

8. The invention as set forth in claim 7 wherein during normal operation the length of loop in one of said boxes is relatively short and oscillates about said upper switch while the length of loop in the other of said boxes oscillates about said lower switch.

References Cited

UNITED STATES PATENTS

| | | | |
|---|---|---|---|
| 3,304,018 | 2/1967 | Kurth | 242—55.12 |
| 3,112,473 | 11/1963 | Wicklund et al. | 242—55.12 |
| 3,251,563 | 5/1966 | Kleist et al. | 242—55.12 |
| 3,343,052 | 9/1967 | Youngstrom | 318—326 |

LEONARD D. CHRISTIAN, *Primary Examiner.*